(12) United States Patent
Na et al.

(10) Patent No.: US 12,424,384 B2
(45) Date of Patent: Sep. 23, 2025

(54) MULTILAYER ELECTRONIC COMPONENT AND METHOD OF MANUFACTURING THE SAME

(71) Applicant: SAMSUNG ELECTRO-MECHANICS CO., LTD., Suwon-si (KR)

(72) Inventors: Won Jun Na, Suwon-si (KR); Yun Sung Kang, Suwon-si (KR); Hoe Chul Jung, Suwon-si (KR); Sun Hwa Kim, Suwon-si (KR); Byeong Gyu Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 202 days.

(21) Appl. No.: 18/209,619

(22) Filed: Jun. 14, 2023

(65) Prior Publication Data

US 2024/0222013 A1 Jul. 4, 2024

(30) Foreign Application Priority Data

Dec. 29, 2022 (KR) .................. 10-2022-0189617
Mar. 10, 2023 (KR) .................. 10-2023-0031805

(51) Int. Cl.
*H01G 4/008* (2006.01)
*H01G 4/30* (2006.01)
*H01G 4/12* (2006.01)

(52) U.S. Cl.
CPC ............. *H01G 4/0085* (2013.01); *H01G 4/30* (2013.01); *H01G 4/1227* (2013.01)

(58) Field of Classification Search
CPC ...... H01G 4/0085; H01G 4/30; H01G 4/1227; H01G 4/012; H01G 4/232
See application file for complete search history.

(56) References Cited

U.S. PATENT DOCUMENTS

| | | | |
|---|---|---|---|
| 11,837,406 B2 * | 12/2023 | Lee | H01G 4/30 |
| 2009/0002920 A1 * | 1/2009 | Itamura | H01G 4/2325 |
| | | | 361/321.3 |
| 2013/0258545 A1 | 10/2013 | Yano et al. | |
| 2013/0321977 A1 | 12/2013 | Lee et al. | |
| 2022/0238634 A1 * | 7/2022 | Na | H10N 70/841 |
| 2023/0231004 A1 * | 7/2023 | Na | H10D 1/696 |
| | | | 257/4 |
| 2023/0245821 A1 * | 8/2023 | Lee | H01G 4/012 |
| | | | 361/301.4 |
| 2023/0298816 A1 * | 9/2023 | Kitamura | H01G 4/008 |
| | | | 361/301.4 |
| 2024/0222013 A1 * | 7/2024 | Na | H01G 4/30 |

FOREIGN PATENT DOCUMENTS

| | | | |
|---|---|---|---|
| JP | 2005-142353 A | 6/2005 | |
| JP | 3744439 B2 * | 2/2006 | ........... H01G 4/0085 |
| JP | 2013-229582 A | 11/2013 | |
| KR | 10-2013-0136247 A | 12/2013 | |

* cited by examiner

*Primary Examiner* — Dion R. Ferguson
(74) *Attorney, Agent, or Firm* — Morgan, Lewis & Bockius LLP

(57) ABSTRACT

A multilayer electronic component includes a body including a plurality of dielectric layers and a plurality of internal electrodes; and external electrodes disposed on the body, wherein the internal electrode includes Ni, Sr, and Ru, and an average content of (Sr+Ru)/(Ni+Sr+Ru) is more than 0 wt and less than 8.40 wt.

48 Claims, 8 Drawing Sheets

MULTILAYER ELECTRONIC COMPONENT AND METHOD OF MANUFACTURING THE SAME

CROSS-REFERENCE TO RELATED APPLICATION(S)

This application claims benefit of priority to Korean Patent Application No. 10-2022-0189617 filed on Dec. 29, 2022 and Korean Patent Application No. 10-2023-0031805 filed on Mar. 10, 2023 in the Korean Intellectual Property Office, the disclosures of which are incorporated herein by reference in their entirety.

BACKGROUND

1. Technical Field

The present disclosure relates to a multilayer electronic component and a method of manufacturing the same.

2. Description of Related Art

A multilayer electronic component (MLCC), a multilayer electronic component, may be a chip condenser mounted on the printed circuit boards of various electronic products such as image display devices including a liquid crystal display (LCD) and a plasma display panel (PDP), a computer, a smartphone, and a mobile phone and charging or discharging electricity.

Such a multilayer ceramic capacitor may be used as a component of various electronic devices as a multilayer ceramic capacitor may have a small size and high capacitance thereof and may be easily mounted. As various electronic devices such as computers and mobile devices have been miniaturized and implemented with high-output, demand for miniaturization and high capacitance multilayer ceramic capacitors has increased.

As one method for miniaturization and high capacitance of a multilayer ceramic capacitor, a method of reducing a thickness of an internal electrode may be used. However, when internal electrodes are formed by printing or applying a conductive paste, it may be difficult to secure uniformity of a thickness of an internal electrode, thicknesses may be different in different positions, and there may be a limitation in extremely reducing a thickness.

To extremely reduce a thickness of an internal electrode, the development of an atomization technique for an internal electrode material may need to be preceded. When a material is atomized and nano-sized, a necking initiation temperature or a melting point between metal powder particles may be lowered, which may result in a decrease in a thermal reduction initiation temperature. In the case of a metal material, a decrease in thermal reduction initiation temperature due to size reduction may be higher than that of a ceramic material, such that there may be a difference in a thermal reduction temperature between a dielectric layer and an internal electrode. As a difference in thermal reduction temperature between a dielectric layer and an internal electrode increases, connectivity between internal electrodes may deteriorate during a firing process, that is, a disconnection area of internal electrodes may increase, a decrease in electric capacity and a decrease in reliability may occur, and as the number of laminated internal electrodes increases, a step difference may occur.

Currently, a method of adding fine barium titanate (BaTiO$_3$) to an internal electrode may be used to reduce a difference in a thermal reduction temperature between a dielectric layer and an internal electrode. When a large amount of barium titanate is added to reduce a thickness of an internal electrode, however, film density of an internal electrode may decrease, and barium titanate may be absorbed into a dielectric layer such that a thickness of the dielectric layer may be increased, and capacitance may be reduced. Accordingly, there is an attempt to add a material having higher thermal stability than barium titanate, and a design of an optimal addition content considering various variables may be necessary.

SUMMARY

An example embodiment of the present disclosure is to implement miniaturization and high capacitance of a multilayer electronic component.

An example embodiment of the present disclosure is to reduce a thickness of an internal electrode.

An example embodiment of the present disclosure is to improve connectivity of an internal electrode.

An example embodiment of the present disclosure is to improve uniformity of an internal electrode.

An example embodiment of the present disclosure is to control a size of dielectric grain.

According to an example embodiment of the present disclosure, a multilayer electronic component includes a body including a plurality of dielectric layers and a plurality of internal electrodes, wherein at least one of the plurality of internal electrodes includes Ni, Sr, and Ru, and an average content of (Sr+Ru)/(Ni+Sr+Ru) is more than 0 wt % and less than 8.40 wt %; and external electrodes disposed on the body.

According to another example embodiment of the present disclosure, a method of manufacturing a multilayer electronic component includes forming a laminate body by laminating a plurality of ceramic green sheets on which a plurality of internal electrode patterns are formed and cutting the ceramic green sheets; firing the laminate body; and forming an external electrode on the fired laminate body, wherein at least one of the plurality of internal electrode patterns is formed by depositing Ni and SrRuO$_3$ using a sputtering method, and wherein a content of SrRuO$_3$ is more than 0 parts by weight and less than 10.0 parts by weight based on 100 parts by weight of Ni.

According to another example embodiment of the present disclosure, a method of manufacturing a multilayer electronic component includes laminating a plurality of ceramic green sheets, wherein an internal electrode pattern is disposed on at least one of the plurality of ceramic green sheets, the internal electrode pattern includes Ni and SrRuO$_3$, and a content of SrRuO$_3$ is more than 0 parts by weight and less than 10.0 parts by weight based on 100 parts by weight of Ni.

According to an example embodiment of the present disclosure, a multilayer electronic component includes a body including a plurality of dielectric layers and a plurality of internal electrodes; and external electrodes disposed on the body, wherein at least one of the plurality of internal electrodes includes Ni, Sr, and Ru, and an average content of (Sr+Ru)/(Ni+Sr+Ru) is more than 0 wt % and 3.61 wt % or less, wherein the at least one of the plurality of internal electrodes includes an electrode region including a conductive material and a disconnected region free of the conductive material, and wherein the at least one of the plurality of internal electrodes satisfies 90%≤C, where C is connectivity of the at least one of the plurality of internal electrodes and is defined as a ratio of a sum of lengths of the electrode region to a total length of the at least one of the plurality of internal electrodes.

BRIEF DESCRIPTION OF DRAWINGS

The above and other aspects, features, and advantages of the present disclosure will be more clearly understood from the following detailed description, taken in combination with the accompanying drawings, in which.

DETAILED DESCRIPTION

Figure 1:
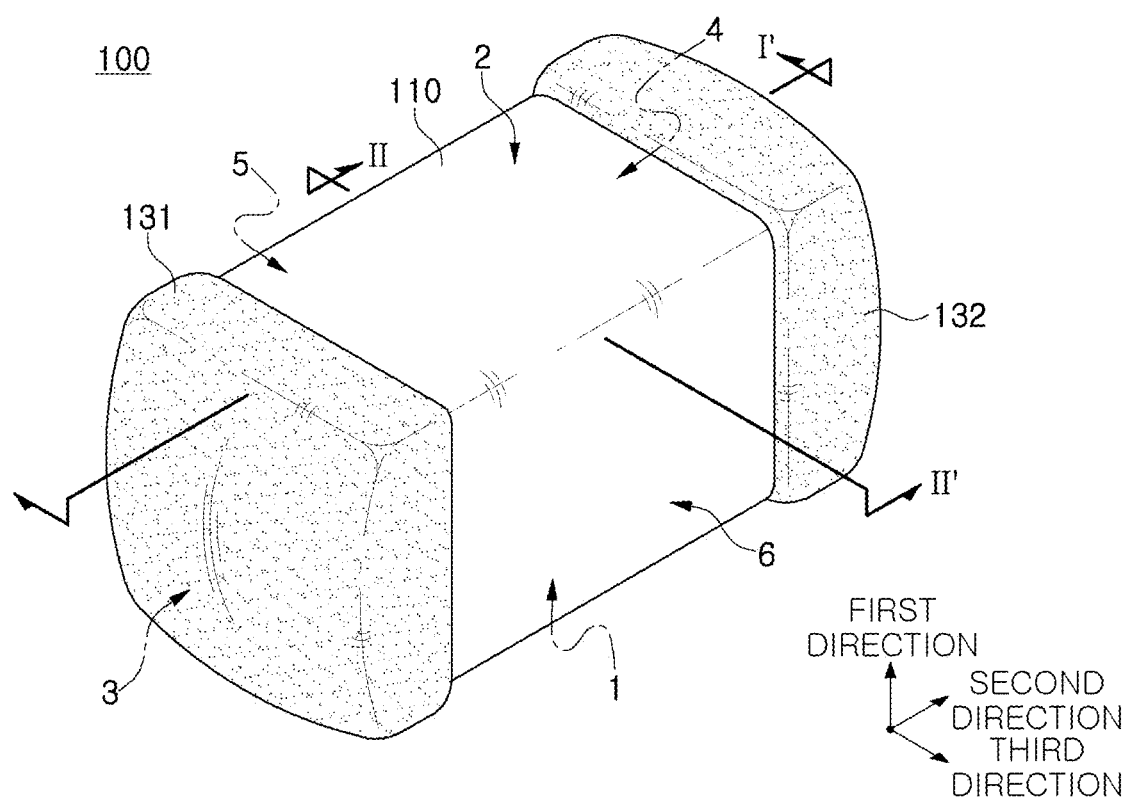
FIG. 1 is a perspective diagram illustrating a multilayer electronic component according to an example embodiment of the present disclosure.

Hereinafter, embodiments of the present disclosure will be described as below with reference to the accompanying drawings.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application.

In the drawings, same elements will be indicated by same reference numerals. Also, redundant descriptions and detailed descriptions of known functions and elements which may unnecessarily make the gist of the present disclosure obscure will not be provided. In the accompanying drawings, some elements may be exaggerated, omitted or briefly illustrated, and the sizes of the elements do not necessarily reflect the actual sizes of these elements. The terms, "include," "comprise," "is configured to," or the like of the description are used to indicate the presence of features, numbers, steps, operations, elements, portions or combination thereof, and do not exclude the possibilities of combination or addition of one or more features, numbers, steps, operations, elements, portions or combination thereof.

In the drawings, a first direction may be defined as a lamination direction or a thickness T direction, a second direction may be defined as a length L direction, and a third direction may be defined as a width W direction.

Multilayer Electronic Component

FIG. 1 is a perspective diagram illustrating a multilayer electronic component according to an example embodiment.

Figure 2:
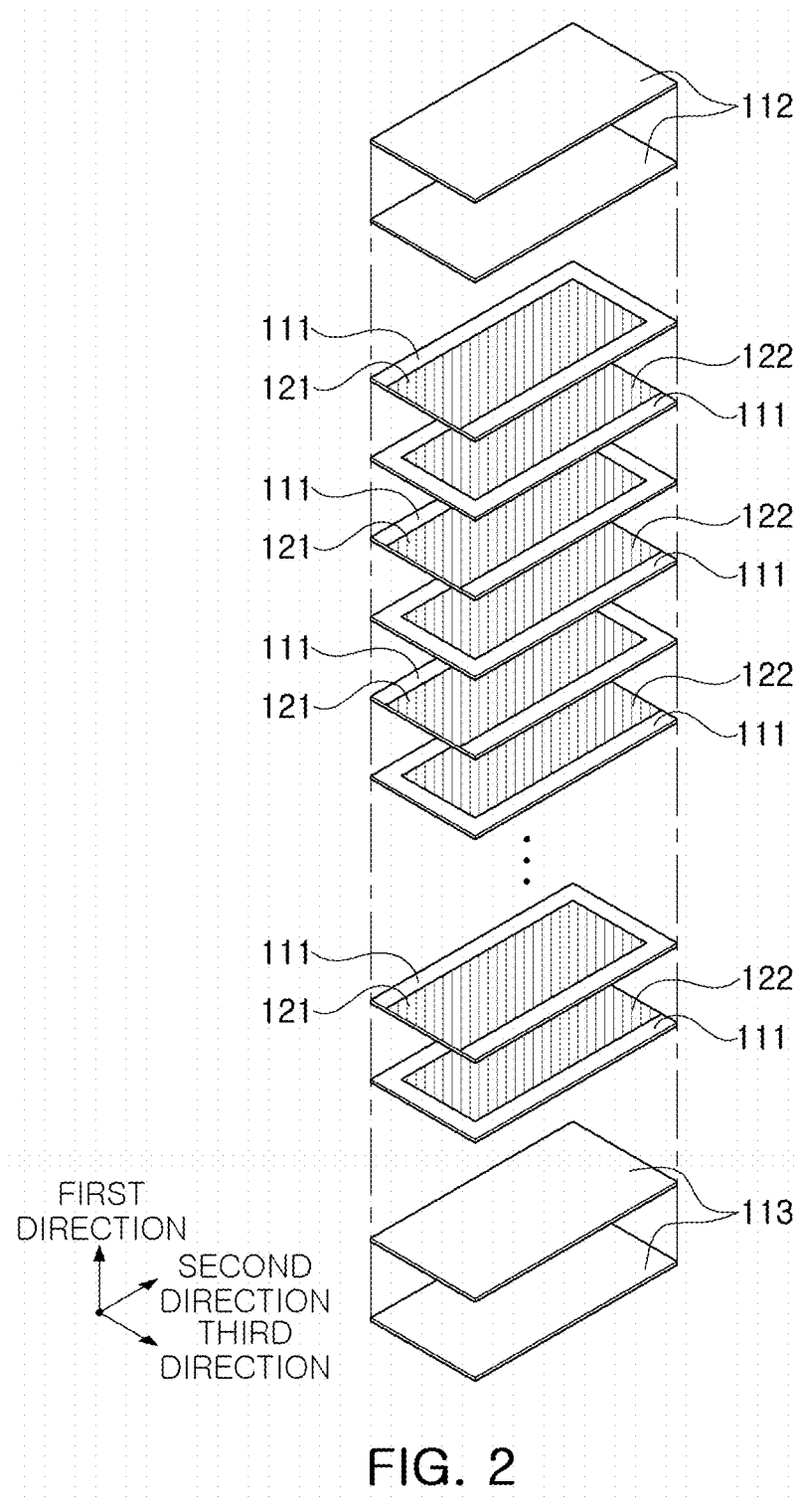
FIG. 2 is an exploded perspective diagram illustrating a laminate structure of internal electrodes according to an example embodiment of the present disclosure.

FIG. 2 is an exploded perspective diagram illustrating a laminate structure of internal electrodes according to an example embodiment.

Figure 3:
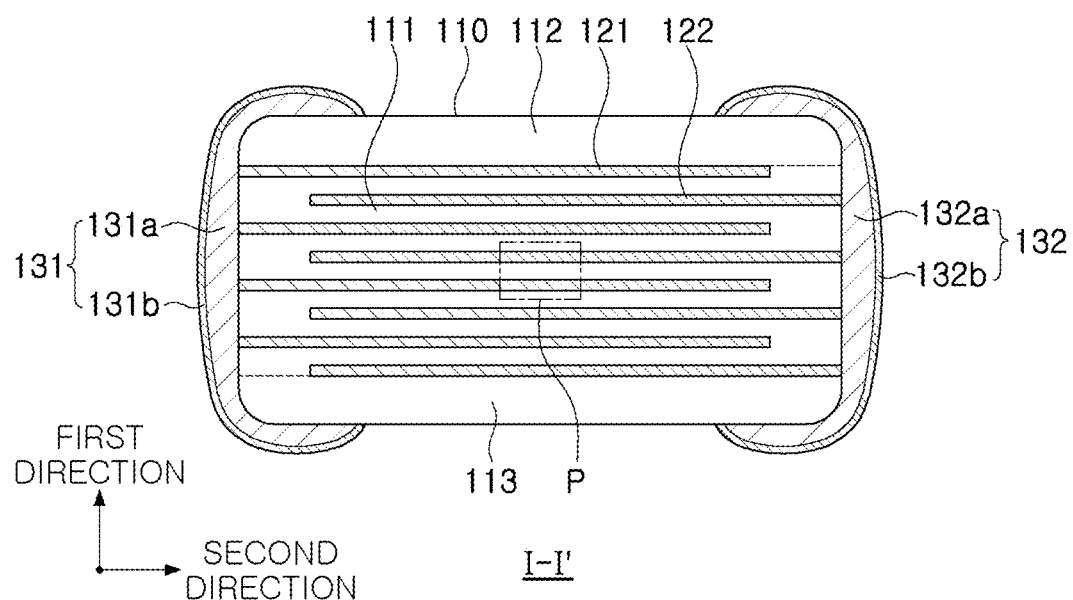
FIG. 3 is a cross-sectional diagram taken along line I-I' in FIG. 1.

FIG. 3 is a cross-sectional diagram taken along line I-I' in FIG. 1.

Figure 4:
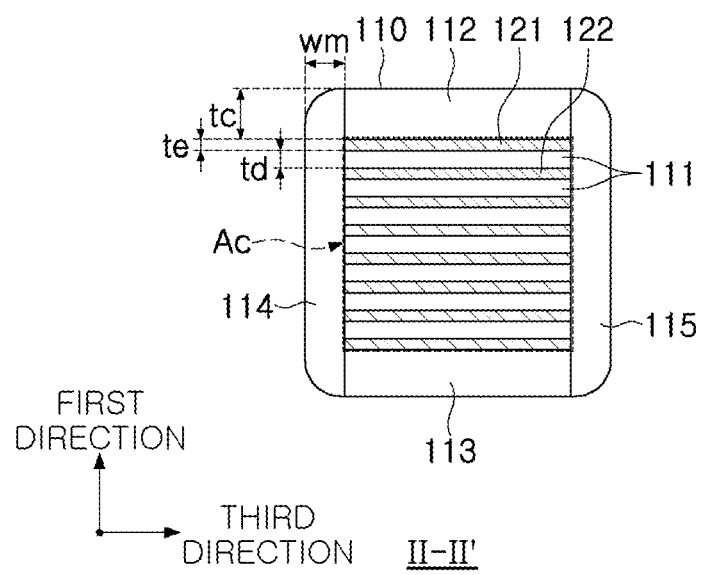
FIG. 4 is a cross-sectional diagram taken along line II-II' in FIG. 1.

FIG. 4 is a cross-sectional diagram taken along line II-II' in FIG. 1.

Figure 5:
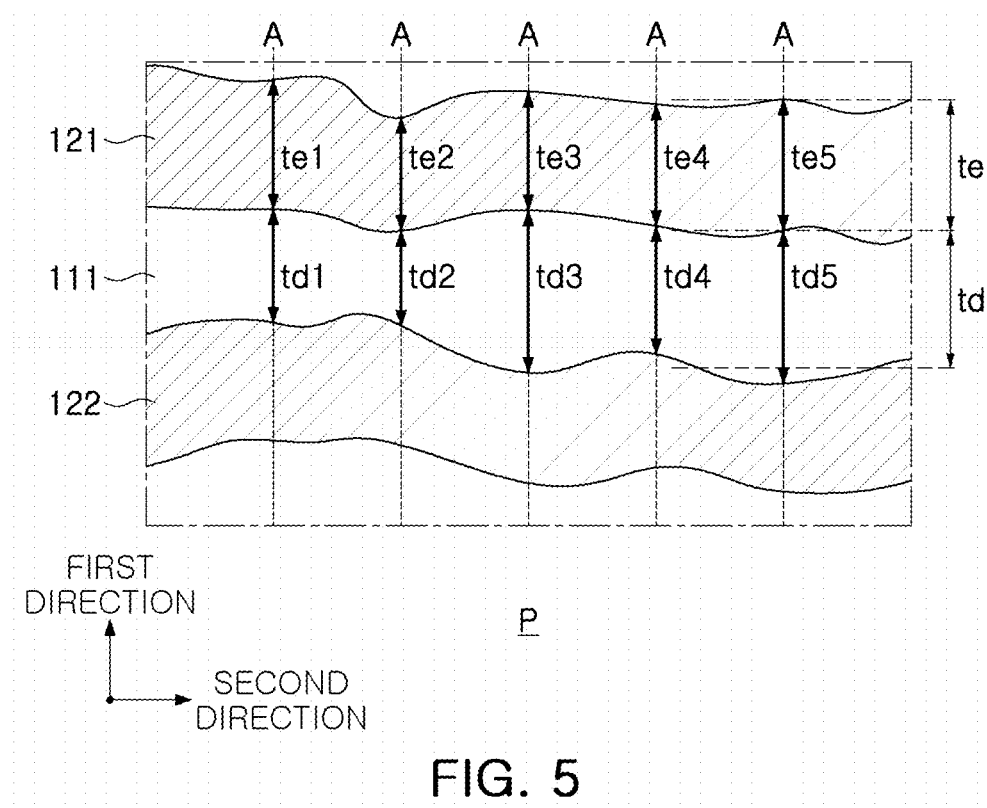
FIG. 5 is an enlarged diagram illustrating region P in FIG. 3.

FIG. 5 is an enlarged diagram illustrating region P in FIG. 3.

Figure 6:
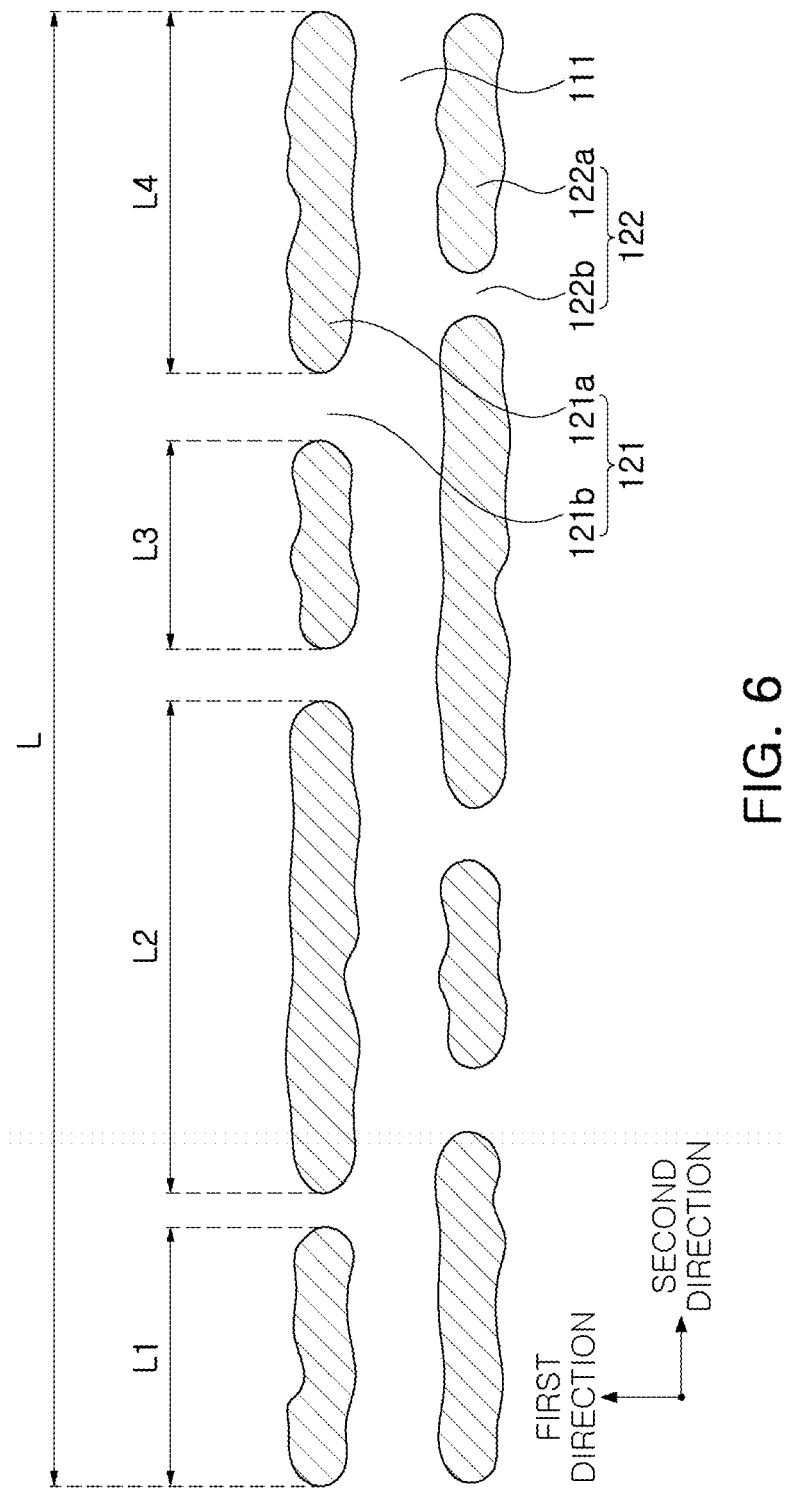
FIG. 6 is an enlarged diagram illustrating a capacitance forming portion according to an example embodiment of the present disclosure.

FIG. 6 is an enlarged diagram illustrating a capacitance forming portion according to an example embodiment.

Hereinafter, a multilayer electronic component according to an example embodiment will be described in greater detail with reference to FIGS. 1 to 6. A multilayer ceramic capacitor will be described as an example of a multilayer electronic component, but the example embodiment may also be applied to various electronic products using a dielectric composition, such as an inductor, a piezoelectric element, a varistor, or a thermistor.

A multilayer electronic component 100 may include a body 110 including a plurality of dielectric layers 111 and a plurality of internal electrodes 121 and 122; and external electrodes 131 and 132 disposed on the body, wherein the internal electrodes 121 and 122 may include Ni, Sr, and Ru, and an average content of (Sr+Ru)/(Ni+Sr+Ru) may be more than 0 wt % and less than 8.40 wt %.

In the body 110, the dielectric layers 111 and the internal electrodes 121 and 122 may be alternately laminated.

More specifically, the body 110 may include a capacitance forming portion Ac disposed in the body 110 and forming capacitance including first internal electrodes 121 and second internal electrodes 122 alternately disposed to face each other with the dielectric layer 111 interposed therebetween.

The shape of the body 110 may not be limited to any particular shape, but as illustrated, the body 110 may have a hexahedral shape or a shape similar to a hexahedral shape. Due to reduction of ceramic powder included in the body 110 during a firing process, the body 110 may not have an exact hexahedral shape formed by linear lines but may have a substantially hexahedral shape.

The body 110 may have first and second surfaces 1 and 2 opposing each other in the first direction, third and fourth surfaces 3 and 4 connected to the first and second surfaces 1 and 2 and opposing in the second direction, and fifth and sixth surfaces 5 and 6 connected to the first and second surfaces 1 and 2 and the third and fourth surfaces 3 and 4 and opposing each other in the third direction.

The plurality of dielectric layers 111 forming the body 110 may be in a fired state, and a boundary between the adjacent dielectric layers 111 may be integrated with each other such that the boundary may not be distinct without using a scanning electron microscope (SEM).

A raw material for forming the dielectric layer 111 is not limited to any particular example as long as sufficient capacitance may be obtained therewith. For example, a barium titanate-based material, a lead composite perovskite-based material, or a strontium titanate-based material may be used. The barium titanate material may include $BaTiO_3$ ceramic powder, and an example of the ceramic powder may include $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ (0<x<1, 0<y<1) or $Ba(Ti_{1-y}Zr_y)O_3$ (0<y<1) in which Ca (calcium), Zr (zirconium) is partially solid-solute.

Also, various ceramic additives, organic solvents, binders, dispersants, or the like, may be added to a raw material for forming the dielectric layer 111 in the example embodiment to powder such as barium titanate ($BaTiO_3$).

The thickness td of the dielectric layer 111 may not be limited to any particular example.

However, to easily implement miniaturization and high capacitance of the multilayer electronic component 100, the thickness td of the dielectric layer 111 may be 0.6 μm or less, and more preferably 0.4 μm or less.

Here, the thickness td of the dielectric layer 111 may refer to an average thickness of the dielectric layer 111 disposed between the first and second internal electrodes 121 and 122.

The thickness td of the dielectric layer 111 may refer to the size of the dielectric layer 111 in the first direction. Also, the thickness td of the dielectric layer 111 may refer to the average thickness td of the dielectric layer 111 and may refer to the average size of the dielectric layer 111 in the first direction.

The average thickness of the dielectric layer 111 may be measured by scanning a cross-section of the body 110 in the first and second directions using a scanning electron microscope (SEM) with a magnification of 10,000. More specifically, an average value may be measured from the thicknesses of the dielectric layer 111 at 5 points spaced apart by an equal distance in the first direction in the scanned image. The 5 points at equal distances may be designated in the active portion Ac. Also, when the average value is measured by extending the measurement of the average value to ten dielectric layers 111, the average thickness of the dielectric layer 111 in the first direction may be further generalized. Other methods and/or tools appreciated by one of ordinary skill in the art, even if not described in the present disclosure, may also be used.

Hereinafter, an example of a method of measuring an average thickness of a dielectric layer and an average thickness of a dielectric layer in the example embodiment will be described in greater detail with reference to FIG. 5.

FIG. 5 is an enlarged diagram illustrating a portion of the capacitance forming portion in cross-sections of the body 110 in the first and second directions, and more specifically, a portion of any internal electrodes 121 and 122 and the dielectric layer 111 included in the region disposed in the center, obtained by dividing the capacitance forming portion Ac into five equal portions in the first direction in the cross-section taken in the first and second directions at a ½ point of the body 110 in the third direction.

The average thickness td of the dielectric layer 111 may be an average value of a size (td1, td2, td3, td4, td5, . . . ) of dielectric layer 111 in the first direction, measured at five or more points (line A) equally spaced apart in the second direction in the region in FIG. 5.

In an example embodiment, the dielectric layer 111 may include a plurality of dielectric grains, and strontium (Sr) may be disposed at dielectric grain boundaries, which are boundaries between grains adjacent to each other. Also, a triple point may be disposed in a region in which three or more dielectric grain boundaries are in contact with each other, and strontium (Sr) may be disposed at the triple point of the dielectric grain. The dielectric grain boundaries and metal grain boundaries (described further below) may be observed by scanning a cross-section of the body 110 in the first and second directions using a scanning electron microscope (SEM). Other methods and/or tools appreciated by one of ordinary skill in the art, even if not described in the present disclosure, may also be used.

Also, an average size GD of the dielectric grains may be 50 nm or more and 300 nm or less.

When the average size GD of dielectric grains is 50 nm or more and 300 nm or less, target insulation resistance properties and dielectric properties may be obtained.

When the average size GD of the dielectric grains is less than 50 nm, dielectric properties may deteriorate, and when the average size GD of the dielectric grains exceeds 300 nm, insulation resistance properties may deteriorate.

Hereinafter, an example of a method of measuring the average size GD of dielectric grains will be described, but an example embodiment thereof is not limited thereto.

The average size of the dielectric grains may be obtained by measuring the average size of the dielectric grains included in the central region of the capacitance forming portion Ac with respect to the cross-sections taken in the first and second directions at a size (distance) ½ point of the body 110 in the third direction. For example, dielectric grains may be extracted through an image program from an image of a 5 μm×5 μm region including an internal electrode and a dielectric layer included in the central region of the capacitance forming portion Ac, obtained by an SEM. Among the extracted dielectric grains, a size (distance) of the longest linear line passing through a center of the dielectric grain may be defined as a size of the dielectric grain, and an average value of the measured sizes of the dielectric grains may be defined as an average size of the dielectric grains. Other methods and/or tools appreciated by one of ordinary skill in the art, even if not described in the present disclosure, may also be used.

For example, the size of five or more dielectric grains (GD1, GD2, GD3, GD4, GD5, . . . ) included in a certain region may be measured, and the average size of dielectric grains GD may be calculated from the average of the measured values.

In an example embodiment, a percentage (CV %) of a size coefficient of variation of dielectric grains, which is a ratio (σGD/GD) of a size standard deviation (σGD) of the dielectric grains to the average size GD of a plurality of dielectric grains, may be more than 0% and 38% or less, preferably 22% or less.

The size standard deviation (σGD) of dielectric grains may be obtained by summing the sizes of five or more dielectric grains measured in a random region (GD1, GD2, GD3, GD4, GD5, . . . ) and values obtained by squaring differences in (GD-GD1, GD-GD2, GD-GD3, GD-GD4, GD-GD5, . . . ) of the average size of dielectric grains measured by the above method, and taking the square root of the value divided by the measured number of dielectric grains.

In this case, the ratio (σGD/GD) of the standard deviation (σGD) of the size of the dielectric grains to the average size GD of a plurality of dielectric grains may be referred to as the size coefficient of variation (CV) of the dielectric grains.

When the percentage (CV %) of the coefficient of variation in the size of dielectric grains exceeds 38%, it may be difficult to implement dielectric grains of uniform size, such that it may be difficult to control the size distribution of dielectric grains, and insulation resistance properties and withstand voltage properties may deteriorate.

The internal electrodes 121 and 122 may be alternately laminated with the dielectric layer 111.

The internal electrodes 121 and 122 may include a first internal electrode 121 and a second internal electrode 122, the first and second internal electrodes 121 and 122 may be alternately disposed to face each other with the dielectric layer 111 included in the body 110 interposed therebetween, and may be exposed to the third and fourth surfaces 3 and 4 of the body 110, respectively.

More specifically, the first internal electrode 121 may be spaced apart from the fourth surface 4 and may be exposed through the third surface 3, and the second internal electrode 122 may be spaced apart from the third surface 3 and may be exposed through the fourth surface 4. The first external electrode 131 may be disposed on the third surface 3 of the body 110 and may be connected to the first internal electrode 121, and the second external electrode 132 may be disposed on the fourth surface 4 of the body 110 and may be connected to the second internal electrode 122.

That is, the first internal electrode 121 may be connected to the first external electrode 131 without being connected to the second external electrode 132, and the second internal electrode 122 may be connected to the second external electrode 132 without being connected to the first external electrode 131. In this case, the first and second internal electrodes 121 and 122 may be electrically separated from each other by the dielectric layer 111 disposed therebetween.

The body 110 may be formed by alternately laminating ceramic green sheets on which the first internal electrodes 121 are printed and ceramic green sheets on which the second internal electrodes 122 are printed, and firing the sheets.

The material for forming the internal electrodes 121 and 122 is not limited to any particular example, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

Also, the internal electrodes 121 and 122 may be formed by printing conductive paste for internal electrodes including one or more of nickel (Ni), copper (Cu), palladium (Pd), silver (Ag), gold (Au), platinum (Pt), tin (Sn), tungsten (W), titanium (Ti), and alloys thereof on a ceramic green sheet. A screen printing method or a gravure printing method may be used as a method of printing the conductive paste for internal electrodes, but an example embodiment thereof is not limited thereto.

However, when the internal electrode is formed by printing or applying a conductive paste, there may be a limitation in extremely reducing the thickness of the internal electrode, for example, forming an internal electrode having a thickness of 0.3 μm or less. In other words, it may be difficult to implement an internal electrode having an ultra-thin thickness with excellent connectivity and uniformity.

To extremely reduce a thickness of an internal electrode, the development of atomization technique for an internal electrode material may need to be preceded. When a material is atomized and nano-sized, a necking initiation temperature or a melting point between metal powder particles may be reduced, which may result in a decrease in a thermal reduction initiation temperature. In the case of a metal material, decrease in thermal reduction initiation temperature due to size reduction may be higher than that of a ceramic material, such that a difference in a thermal reduction temperature between a dielectric layer and an internal electrode. As a difference in thermal reduction temperature between a dielectric layer and an internal electrode increases, connectivity between internal electrodes may deteriorate during a firing process, that is, a disconnection area of internal electrodes may increase, a decrease in electric capacity and a decrease in reliability may occur, and as the number of laminated internal electrodes increases, a step difference may occur.

Currently, a method of adding fine-sized barium titanate ($BatiO_3$) to an internal electrode may be used to reduce a difference in a thermal reduction temperature between a dielectric layer and an internal electrode. When a large amount of barium titanate is added to reduce a thickness of an internal electrode, however, film density of an internal electrode may decrease, and barium titanate may be absorbed into a dielectric layer such that a thickness of the dielectric layer may be increased, and capacitance may be reduced.

Accordingly, in an example embodiment, the internal electrodes 121 and 122 may have an ultra-thin thickness, for example, a thickness of more than 0 μm and 0.3 μm or less, preferably 0.25 μm or less, or more preferably 0.22 μm or less, using thin film deposition methods such as sputtering, or vacuum deposition, physical vapor deposition (PVD) and chemical vapor deposition (CVD), and connectivity and uniformity of the internal electrode may improve. Also, when forming the internal electrode, strontium-ruthenium oxide ($SrRuO_3$) may be added to increase a thermal reduction initiation temperature of the internal electrode, thereby reducing the thermal contraction temperature difference between the dielectric layer and the internal electrode, and improving connectivity of the internal electrode.

In an example embodiment, strontium-ruthenium oxide ($SrRuO_3$) may reduce a difference in thermal contraction temperatures between the dielectric layer and the internal electrode. That is, strontium-ruthenium oxide ($SrRuO_3$) may work as a conventional co-material. However, the addition of other co-materials including ceramic particles such as barium titanate ($BaTiO_3$) may not be excluded.

Accordingly, the internal electrodes 121 and 122 may include nickel (Ni), strontium (Sr), and ruthenium (Ru). In this case, the average content of (Sr+Ru)/(Ni+Sr+Ru) included in the internal electrodes 121 and 122 may be more than 0 wt % and less than 8.40 wt %.

Here, the ratio of the content of each element (Sr+Ru)/(Ni+Sr+Ru) may refer to a sum of the mass percentages (wt %) of strontium (Sr) and ruthenium (Ru) elements relative to a sum of the mass percentages (wt %) of nickel (Ni), strontium (Sr) and ruthenium (Ru) elements detected through EDS analysis in the internal electrodes 121 and 122. In this case, the sum of the mass percentages (wt %) of the elements Nickel (Ni), Strontium (Sr) and Ruthenium (Ru), excluding the mass percentage (wt %) values of elements other than nickel (Ni), strontium (Sr), and ruthenium (Ru), may be calculated as 100 wt %.

For example, when an element is detected through point-EDS in an internal electrode, the total mass percentage (wt %) of nickel (Ni), strontium (Sr), and ruthenium (Ru) elements may be converted to 100 wt %, and when the converted result is 98.45 wt % of nickel (Ni), 0.40 wt % of strontium (Sr), and 1.15 wt % of ruthenium (Ru), the value of (Sr+Ru) may be 1.55 wt %, the value of (Ni+Sr+Ru) may be 100 wt %, and consequently the value of (Sr+Ru)/(Ni+Sr+Ru) may be 1.55 (wt %).

As the EDS analysis device, for example, a scanning electron microscope-energy dispersive X-ray spectrometer (SEM-EDS), a transmission electron microscope-energy dispersive X-ray Spectrometer (TEM-EDS), or a scanning transmission electron microscope-energy dispersive X-ray spectrometer (STEM-EDS) analysis device may be used, but an example embodiment thereof is not limited thereto.

A method of measuring the type and content of elements included in the dielectric layer 111 or the internal electrodes 121 and 122 is not limited to any particular example. As an example, the type and content of elements may be calculated from an image observed using SEM-EDS, TEM-EDS, or STEM-EDS. More specifically, the cross-section in the first and second directions may be exposed by polishing the body 110 up to the ½ point along the third direction, and the type and content (wt %, at %, and mol %) of each element included in dielectric layer 111 and the internal electrode 121 and 122 disposed in the central region of the capacitance forming portion Ac may be measured using an EDS.

A method of measuring the average content (wt %, at %, mol %) of elements detected through EDS analysis may be as below, but an example embodiment thereof is not limited thereto.

First, using the above-described method, an arbitrary internal electrode 5 layer disposed in the central region may be selected in a cross-section of the body 110 in the first and second directions and at ½ point of the body 110 along the third direction. Thereafter, point-EDS analysis may be performed on the central region of each selected internal electrode, and the average content (wt %, at %, mol %) of each detected element may be the average content (wt %, at %, mol %) of the element.

When the average content of (Sr+Ru)/(Ni+Sr+Ru) included in the internal electrodes 121 and 122 is more than 0 wt % and less than 8.40 wt %, connectivity of the internal electrodes 121 and 122 may be improved, and a uniform thickness may be obtained.

An average content of (Sr+Ru)/(Ni+Sr+Ru) included in the internal electrodes 121 and 122 may be more than 0 wt % and less than 8.40 wt %.

Here, the preferable upper limit may be 7.0 wt % or less, 5.0 wt % or less, or 3.61 wt % or less, and the preferable lower limit may be 0.1 wt % or more, 0.5 wt % or more, 1.0 wt % or more, or 1.55 wt % or more.

When the average content of (Sr+Ru)/(Ni+Sr+Ru) included in the internal electrodes 121 and 122 is 8.40 wt % or more, firing may not be completed or dielectric properties may deteriorate.

Meanwhile, the average content of Sr/(Ni+Sr+Ru) included in the internal electrodes 121 and 122 may be more than 0 wt % and less than 1.18 wt %.

The strontium (Sr) element included in the internal electrodes 121 and 122 may diffuse into the dielectric layer 111 during the firing process. When an excessive amount of strontium (Sr) is added to the internal electrodes 121 and 122, the amount of strontium (Sr) diffused into the dielectric layer 111 may increase, strontium (Sr) may be adsorbed to the surface of the dielectric particles, and firing may be delayed, and the completion of firing may be suppressed, such that dielectric properties may be degraded or dielectric properties may not be realized.

A small amount of strontium (Sr) may promote grain growth of dielectric particles, but an excessive amount of strontium (Sr) may suppress the grain growth of dielectric particles. Accordingly, grain growth of dielectric particles may be controlled by adding an appropriate amount of strontium (Sr).

Also, the average content of Ru/(Ni+Sr+Ru) included in the internal electrodes 121 and 122 may be more than 0 wt % and less than 2.43 wt %.

The melting point of ruthenium (Ru) may be about 2,334° C., which may be about 879° C. higher than the melting point of nickel (Ni), about 1,455° C. Due to its high melting point, ruthenium (Ru) may hardly react with nickel (Ni) during the firing process, and may suppress necking between nickel (Ni) metal particles such that a thermal reduction initiation temperature may increase.

Diffusion of ruthenium (Ru) into the dielectric layer 111 may be prevented during firing. In other words, the average content of ruthenium (Ru) included in the internal electrodes 121 and 122 may be higher than the average content of ruthenium (Ru) included in the dielectric layer 111.

Also, ruthenium (Ru) may be disposed at a grain boundary or a triple point of nickel (Ni) metal and may prevent grain growth of nickel (Ni).

More specifically, the internal electrodes 121 and 122 may include a plurality of metal grains, and ruthenium (Ru) may be disposed at a metal grain boundary, which is a boundary between metal grains adjacent to each other. Also, a triple point may be disposed in a region in which three or more metal grain boundaries are in contact with each other, and ruthenium (Ru) may be disposed at the triple point of the metal grain boundary.

The internal electrodes 121 and 122 may include an oxide including at least one of strontium (Sr) and ruthenium (Ru).

For example, the internal electrodes 121 and 122 may include at least one of strontium oxide ($SrO_2$), ruthenium oxide ($RuO_2$), and strontium-ruthenium oxide ($SrRuO_3$), but an example embodiment thereof is not limited thereto. This may be the result of decomposition of a portion of strontium-ruthenium oxide ($SrRuO_3$), added when forming the internal electrodes 121 and 122, into strontium oxide ($SrO_2$) and ruthenium oxide ($RuO_2$) during a firing, the result of remaining undecomposed strontium-ruthenium oxide ($SrRuO_3$), and the result of their second-phase precipitation.

Also, the internal electrodes 121 and 122 may include at least one of a nickel (Ni)-strontium (Sr) alloy and a nickel (Ni)-ruthenium (Ru) alloy.

This is the result of a portion of strontium-ruthenium oxide ($SrRuO_3$) reacting with nickel (Ni) during the firing process such that a nickel (Ni)-strontium (Sr) alloy or a nickel (Ni)-ruthenium (Ru) alloy may be formed.

The thickness te of the internal electrodes 121 and 122 may not need to be limited to any particular example.

However, to easily implement miniaturization and high capacitance of the multilayer electronic component 100, the thickness te of the internal electrodes 121 and 122 may be 0.4 μm or less, preferably 0.3 μm or less, and more preferably 0.22 μm or less.

Here, it may be preferable to form the thickness of 0.3 μm or less using the aforementioned sputtering method or deposition method. In the case of forming an internal electrode using a sputtering method or the like, it may be formed with a uniform thickness.

In the case of depositing the internal electrode using the sputtering method, a material which may increase the thermal reduction initiation temperature, for example, strontium-ruthenium oxide ($SrRuO_3$), may be deposited together, thereby increasing the sintering initiation temperature between metal particles of the internal electrode, and improving connectivity of the internal electrode. In this case, when metal particles of the internal electrode and a material increasing the thermal reduction initiation temperature are simultaneously deposited using the sputtering method, connectivity of the internal electrode may be improved.

Here, the thickness te of the internal electrodes 121 and 122 may refer to the size of the internal electrodes 121 and 122 in the first direction. Also, the thickness te of the internal electrodes 121 and 122 may refer to the average thickness te of the internal electrodes 121 and 122, and may refer to the average size of the internal electrodes 121 and 122 in the first direction.

The average thickness of the internal electrodes 121 and 122 may be measured by scanning a cross-section of the body 110 in the first and second directions using a scanning electron microscope (SEM) with a magnification of 10,000. More specifically, an average value may be measured from the thicknesses of the internal electrodes 121 and 122 at 30 points spaced apart by an equal distance in the second direction in the scanned image. The 30 points at equal distances may be designated in the active portion Ac. Also, when the average value is measured by extending the measurement of the average value to ten internal electrodes 121 and 122, the average thickness of the internal electrodes 121 and 122 may be further generalized. Other methods and/or tools appreciated by one of ordinary skill in the art, even if not described in the present disclosure, may also be used.

in an example embodiment, the average thickness te of at least one of the plurality of internal electrodes 121 and 122 may be smaller than the average thickness td of at least one of the plurality of dielectric layers 111, preferably the average thickness of the internal electrode te may be smaller than the average thickness td of the dielectric layer.

Accordingly, miniaturization and high capacitance of the multilayer electronic component 100 may be obtained by reducing the average thickness te of the internal electrode, and by forming the dielectric layer 111 to have a sufficiently thick thickness, insulation resistance properties and withstand voltage properties may be improved. In particular, in an example embodiment, since the internal electrodes 121 and 122 include nickel (Ni), strontium (Sr), and ruthenium (Ru), the internal electrodes 121 and 122 may be further thinned, such that the effect of improving insulation resistance properties and withstand voltage properties may be prominent.

Hereinafter, the significance of an average thickness of an internal electrode and a standard deviation of a thickness of an internal electrode and an example of a method of measuring the same in the example embodiment will be described in greater detail with reference to FIG. 5.

For example, the average thickness te of the first internal electrode 121 may be an average value of sizes (te1, te2, te3, te4, te5, . . . ) of the first internal electrode 121 in the first direction, measured at five or more equally spaced points (line A) in the second direction in the region in FIG. 5. When this average value measurement is extended to 10 or more internal electrodes 121 and 122, the average size of the internal electrodes 121 and 122 in the first direction may be further generalized.

The thickness standard deviation (σte) of the first internal electrode may be obtained by summing the size (te1, te2, te3, te4, te5, . . . ) of the first internal electrode 121 in the first direction measured at five or more equally spaced points (line A) in the second direction, and values obtained by squaring the difference (te-te1, te-te2, te-te3, te-te4, te-te5, . . . ) of the average thickness te of the first internal electrode 121 measured by the above-described method, and taking the square root of the value divided by the number of measured positions.

In this case, the ratio (σte/te) of the standard deviation σte of the thickness of the internal electrode to the average thickness te of the internal electrode may be referred to as the thickness coefficient of variation (CV) of the internal electrode.

In an example embodiment, a percentage (CV %) of the thickness coefficient of variation of the internal electrode, which is the ratio (σte/te) of the standard deviation σte of the thickness of the internal electrode to the average thickness te of the internal electrode) of at least one of the plurality of internal electrodes, may be more than 0% and 43% or less, preferably 30% or less.

When the percentage of the thickness coefficient of variation of the internal electrode is 43% or less, uniformity of the thickness of the internal electrode may be improved.

When the percentage of the coefficient of variation in the thickness of the internal electrode exceeds 43%, uniformity of the thickness of the internal electrode may deteriorate and interfacial bonding properties with the adjacent dielectric layer 111 may deteriorate, such that delamination between the internal electrode and the dielectric layer may occur and a step difference may occur due to an increase in the number of laminations.

FIG. 6 illustrates an enlarged diagram illustrating a portion of a capacitance forming portion Ac in cross-sections of a multilayer electronic component in first and second directions according to an example embodiment.

In an example embodiment, the internal electrodes 121 and 122 may include electrode regions 121a and 122a including a conductive material and disconnected regions 121b and 122b not including (free of) a conductive material, and when the ratio of the sum of the lengths of the electrode region to the total length L of the internal electrode (L1+L2+L3+L4+ . . . ) is defined as the connectivity C of the internal electrode, at least one of the plurality of internal electrodes may satisfy 90%≤C, more preferably 95%≤C.

Here, the total length L of the internal electrode may refer to the size in the second direction including the electrode regions 121a and 122a and the disconnected regions 121b and 122b in a layer of the internal electrodes 121 and 122, and the electrode region lengths (L1, L2, L3, L4, . . . ) may refer to the size of the electrode regions 121a and 122a in the second direction, excluding the disconnected regions 121b and 122b. Connectivity C of internal electrodes may be further generalized by extending to more than 10 internal electrodes 121 and 122. The lengths may be measured by scanning a cross-section of the body 110 in the first and second directions using a scanning electron microscope (SEM). Other methods and/or tools appreciated by one of ordinary skill in the art, even if not described in the present disclosure, may also be used.

The electrode regions 121a and 122a and the disconnected regions 121b and 122b may be distinguished by the difference in contrast in the image observed at a magnification of 10,000 times or more with a scanning electron microscope, and the contrast differences may be more clearly distinguished through an image program.

When the connectivity C of the internal electrode is 90% or more, the capacitance improvement effect may be more excellent, and a step difference due to the increase in the number of laminations may be suppressed.

The effect of improving connectivity C of the internal electrode may be more excellent when the average thickness te of the internal electrode is 0.3 μm or less.

The body 110 may include cover portions 112 and 113 disposed on both end-surfaces of the capacitance forming portion Ac in the first direction.

More specifically, the body 110 may include an upper cover portion 112 disposed above the capacitance forming portion Ac in the first direction and a lower cover portion 113 disposed below the capacitance forming portion Ac in the first direction.

The upper cover portion 112 and the lower cover portion 113 may be formed by laminating a single dielectric layer 111 or two or more dielectric layers 111 on the upper and lower surfaces of the capacitance forming portion Ac in a first direction, and may prevent damages to the internal electrodes 121 and 122 due to physical or chemical stress.

The upper cover portion 112 and the lower cover portion 113 may not include the internal electrodes 121 and 122 and may include the same material as that of the dielectric layer 111. That is, the upper cover portion 112 and the lower cover portion 113 may include a ceramic material, for example, a barium titanate ($BaTiO_3$) ceramic material.

The thickness tc of the cover portion 112 and 113 may not need to be limited to any particular example.

However, to easily obtain miniaturization and high capacitance of multilayer electronic components, the thickness tc of the cover portions 112 and 113 may be 100 μm or less, preferably 30 μm or less. More preferably, the thickness may be 20 μm or less.

Here, the thickness tc of the cover portion 112 or 113 may refer to the size of the cover portion 112 or 113 in the first direction. Also, the thickness tc of the cover portions 112 and 113 may refer to the average thickness tc of the cover portions 112 and 113, and may refer to the average size of the cover portions 112 and 113 in the first direction.

The average thickness of the cover portions 112 and 113 may be measured by scanning a cross-section of the body 110 in the first and second directions using a scanning electron microscope (SEM) with a magnification of 10,000. More specifically, an average value may be measured from the thicknesses of the cover portion at 30 points spaced apart by an equal distance in the first direction in the scanned image. Other methods and/or tools appreciated by one of ordinary skill in the art, even if not described in the present disclosure, may also be used.

Also, the average size of the cover portion in the first direction measured by the above method may be substantially the same as the average size of the cover portion in the first direction in the cross-sections of the body 110 in the first and third directions.

The side margin portions 114 and 115 may be disposed on end-surfaces of the body 110 in the third direction.

More specifically, the side margin portions 114 and 115 may include a first side margin portion 114 disposed on the fifth surface 5 and a second side margin portion 115 disposed on the sixth surface 6 of the body 110. That is, the side margin portions 114 and 115 may be disposed on both end-surfaces of the body 110 in the third direction.

As illustrated, the side margin portions 114 and 115 may refer to a region between both end-surfaces of the first and second internal electrodes 121 and 122 in the third direction and the boundary surface of the body 110 with respect to the cross-section of the body 110 in the first and third directions.

The side margin portions 114 and 115 may basically prevent damages to the internal electrodes 121 and 122 due to physical or chemical stress.

The side margin portions 114 and 115 may be formed by forming internal electrodes 121 and 122 on the ceramic green sheet by applying a conductive paste other than the region in which the side margin portions 114 and 115 are formed, cutting the laminated internal electrodes 121 and 122 to expose the fifth and sixth surfaces 5 and 6 of the body 110 to prevent a step difference caused by the internal electrodes 121 and 122, and laminating a single dielectric layer 111 or two or more dielectric layers 111 in a third direction on both end-surfaces of the capacitance forming portion Ac in the third direction.

The first side margin portion 114 and the second side margin portion 115 may not include the internal electrodes 121 and 122 and may include the same material as that of the dielectric layer 111. That is, the first side margin portion 114 and the second side margin portion 115 may include a ceramic material, for example, a barium titanate ($BaTiO_3$) ceramic material.

Meanwhile, the width wm of the first and second side margin portions 114 and 115 may not need to be limited to any particular example.

However, to easily obtain miniaturization and high capacitance of the multilayer electronic component 100, the width wm of the side margin portions 114 and 115 may be 100 μm or less, preferably 30 μm or less, and may be more preferably 20 μm or less in ultra-small products.

Here, the width wm of the side margin portions 114 and 115 may refer to the size of the side margin portions 114 and 115 in the third direction. Also, the width wm of the side margin portions 114 and 115 may refer to the average width wm of the side margin portions 114 and 115, and the average size of the side margin portions 114 and 115 in the third direction.

The average size of the side margin portion 114 and 115 in the third direction may be measured by scanning a cross-section of the body 110 in the first and third directions using a scanning electron microscope (SEM) with a magnification of 10,000. More specifically, the average size may be an average value measured from the size in the third direction at 10 points spaced apart from each other by an equal distance in the first direction in the scanned image of one of the side margin portions. Other methods and/or tools appreciated by one of ordinary skill in the art, even if not described in the present disclosure, may also be used.

In an example embodiment, the multilayer electronic component 100 may have two external electrodes 131 and 132, but the number or shape of the external electrodes 131 and 132 may be varied depending on the forms of the internal electrode 121 and 122 or other purposes.

The external electrodes 131 and 132 may be disposed on the body 110 and may be connected to the internal electrodes 121 and 122.

More specifically, the external electrodes 131 and 132 may be disposed on the third and fourth surfaces 3 and 4 of the body 110, respectively, and may include first and second external electrodes 131 and 132 connected to the first and second internal electrodes 121 and 122, respectively. That is, the first external electrode 131 may be disposed on the third surface 3 of the body and may be connected to the first internal electrode 121, and the second external electrode 132 may be disposed on the fourth surface 4 of the body and may be connected to the second internal electrode 122.

The external electrodes 131 and 132 may be formed of any material having electrical conductivity, such as metal, and a specific material may be determined in consideration of electrical properties and structural stability, and the external electrodes 131 and 132 may have a multilayer structure.

For example, the external electrodes 131 and 132 may include electrode layers 131a and 132a disposed on the body 110 and plating layers 131b and 132b disposed on the electrode layers 131a and 132a.

For a more specific example of the electrode layers 131a and 132a, the electrode layers 131a and 132a may be sintered electrodes including a first conductive metal and glass, or a second conductive metal and resin.

Also, the electrode layers 131a and 132a may have a form in which a plastic electrode and a resin-based electrode are formed in order on the body.

Also, the electrode layers 131a and 132a may be formed by transferring a sheet including a conductive metal onto a body or by transferring a sheet including a conductive metal onto a fired electrode.

A conductive metal used in the electrode layers 131a and 132a is not limited to any particular example as long as the material may be electrically connected to the internal electrodes 121 and 122 to form capacitance. For example, the conductive metal may include one or more selected from a group consisting of nickel (Ni), copper (Cu), palladium (Pd), silver (Ag), gold (Au), platinum (Pt), tin (Sn), tungsten (W), titanium (Ti) and alloys thereof, but an example embodiment thereof is not limited thereto. The electrode layers 131a and 132a may be formed by applying a conductive paste prepared by adding glass frit to the conductive metal powder and firing the paste.

The plating layers 131b and 132b may improve mounting properties.

The type of the plating layers 131b and 132b is not limited to any particular example, and single-layer plating layers 131b and 132b including at least one of nickel (Ni), tin (Sn), palladium (Pd), and alloys thereof, and may include a plurality of layers.

For a more specific example of the plating layers 131b and 132b, the plating layers 131b and 132b may be Ni plating layers or Sn plating layers, and Ni plating layers and Sn plating layers may be formed in order on the electrode layers 131a and 132a, and a Sn plating layer, a Ni plating layer, and a Sn plating layer may be formed in order. Also, the plating layers 131b and 132b may include a plurality of Ni plating layers and/or a plurality of Sn plating layers.

The size of the multilayer electronic component 100 may not need to be limited to any particular example.

However, to obtain both miniaturization and high capacitance, the thickness of the dielectric layer and internal electrode may need to be reduced to increase the number of laminations, such that, in a multilayer electronic component (100) having a size of 1005 (length×width, 1.0 mm×0.5 mm) or 0603 (length×width, 1.0 mm×0.5 mm) or less, the effect in the example embodiment may be excellent.

Method of Manufacturing Multilayer Electronic Component

In the description below, an example embodiment will be described in greater detail.

The method of manufacturing a multilayer electronic component according to an example embodiment may include forming a laminate body by laminating a plurality of ceramic green sheets on which a plurality of internal electrode patterns are formed and cutting the ceramic green sheets; firing the laminate body; and forming an external electrode on the fired laminate body, wherein the internal electrode pattern is formed by depositing Ni and $SrRuO_3$ using a sputtering method, and wherein a content of $SrRuO_3$ is more than 0 parts by weight and less than 10.0 parts by weight based on 100 parts by weight of Ni.

First, a laminate body may be formed by laminating a plurality of ceramic green sheets on which a plurality of internal electrode patterns are formed and cutting the ceramic green sheets.

More specifically, a plurality of first stripe-shaped internal electrode patterns may be formed on the ceramic green sheet with a predetermined distance therebetween. The plurality of first stripe-shaped internal electrode patterns may be formed parallel to each other, and a ceramic green sheet on which the first internal electrode patterns are formed may be defined as a first ceramic green sheet. Also, a plurality of second stripe-shaped internal electrode patterns may be formed on another ceramic green sheet with a predetermined distance, and a ceramic green sheet on which the second internal electrode pattern is formed may be defined as a second ceramic green sheet.

The ceramic green sheet may include a ceramic slurry including a ceramic material, an organic solvent, and an organic binder. The ceramic material may be a material having a high dielectric constant, and the type of the material is not limited to any particular example, but a perovskite ($ABO_3$)-based material may be used, for example, a barium titanate-based material, a lead composite perovskite-based material, or a strontium titanate-based material may be used. The barium titanate-based material may include $BaTiO_3$-based ceramic powder, and as an example of the ceramic powder, $(Ba_{1-x}Ca_x)TiO_3$ ($0<x<1$), $Ba(Ti_{1-y}Ca_y)O_3$ ($0<y<1$), $(Ba_{1-x}Ca_x)(Ti_{1-y}Zr_y)O_3$ ($0<x<1$, $0<y<1$) or $Ba(Ti_{1-y}Zr_y)O_3$ ($0<y<1$) in which Ca (calcium) and Zr (zirconium) are partially employed in $BaTiO_3$ and $BaTiO_3$.

The internal electrode pattern may be formed by applying a paste for internal electrode on a ceramic green sheet using a screen printing method or a gravure printing method, but an example embodiment thereof is not limited thereto.

When forming an ultra-thin internal electrode pattern, for example, to have a thickness of 0.3 μm or less, the screen printing method may have limitations in obtaining target connectivity and uniformity of the internal electrode. In this case, when using the above-mentioned sputtering method, and deposition method, there is an effect of obtaining the ultra-thin thickness of the internal electrode and improving both connectivity and uniformity.

In an example embodiment, the internal electrode pattern may be formed by depositing nickel (Ni) and strontium-ruthenium oxide ($SrRuO_3$) using a sputtering method.

Here, strontium-ruthenium oxide ($SrRuO_3$) may be added only to the internal electrode pattern to work as a common material added for connectivity of the internal electrode, and may not be included in the ceramic green sheet, but an example embodiment thereof is not limited thereto.

In the example embodiment, nickel (Ni) may be used as an example of a conductive metal for forming an internal electrode pattern, but an example embodiment thereof is not limited thereto, and any material having excellent electrical conductivity and forming the internal electrodes 121 and 122 may be used.

In the sputtering method, nickel (Ni) may be deposited using a first sputtering gun, and strontium-ruthenium oxide ($SrRuO_3$) may be deposited using a second sputtering gun.

When nickel (Ni) and strontium-ruthenium oxide ($SrRuO_3$) are deposited using different sputtering guns, strontium-ruthenium oxide ($SrRuO_3$) may be uniformly distributed between nickel (Ni) metal particles, such that the necking between (Ni) nickel metal particles or aggregation of internal electrodes may be prevented, which may effectively improve connectivity of internal electrodes.

In this case, when nickel (Ni) and strontium-ruthenium oxide ($SrRuO_3$) are simultaneously deposited using the first and second sputtering guns, the necking between nickel (Ni) metal particles or aggregation of internal electrodes may be effectively prevented, and the thermal reduction initiation temperature may improve such that connectivity of the internal electrode may be improved.

The sputtering method may be used under conditions or methods as below, but an example embodiment thereof is not limited thereto, and any of various conditions to which the sputtering method may be applied may be used.

First, an internal electrode pattern may be deposited on a ceramic green sheet using a sputtering facility in which two or more target guns are installed. In this case, a steel use stainless (SUS) mask may be disposed on the ceramic green sheet to form an internal electrode pattern, and an internal electrode pattern to be formed may be deposited using a sputtering facility. In this case, nickel (Ni) and strontium-ruthenium oxide ($SrRuO_3$) may be simultaneously deposited while maintaining a vacuum degree of $10^{-5}$ torr or more as a pressure condition.

The thickness of the internal electrode pattern may be proportional to the deposition time. That is, the thickness of the internal electrode pattern may be adjusted by adjusting the deposition time. Controlling the thickness of the internal electrode through the deposition time may indicate that, for example, the thickness of the internal electrode pattern may increase when the deposition time is increased, and the thickness of the internal electrode pattern may decrease when the deposition time is reduced. However, being proportional may not necessarily indicate being directly proportional.

The deposition rate of nickel (Ni) and strontium-ruthenium oxide ($SrRuO_3$) may be controlled through an output value after checking the deposition rate for each output of each material.

In this case, the content of strontium-ruthenium oxide ($SrRuO_3$) may be more than 0 parts by weight and less than 10.0 parts by weight based on 100 parts by weight of nickel (Ni).

Here, the preferable upper limit may be 8.5 parts by weight or less, 7.0 parts by weight or less, or 5.0 parts by weight or less, and the preferable lower limit may be 0.1 parts by weight or more, 0.5 parts by weight or more, 1.5 parts by weight or more, or 2.5 parts by weight or more.

"Parts by weight" may refer to a relative content based on a standard content of a substance. For example, 5.0 parts by weight of strontium-ruthenium oxide ($SrRuO_3$) based on 100 parts by weight of nickel (Ni) may refer to 5.0 g of strontium-ruthenium oxide ($SrRuO_3$) per 100 g of nickel (Ni).

When the content of strontium-ruthenium oxide ($SrRuO_3$) is more than 0 parts by weight and less than 10.0 parts by weight based on 100 parts by weight of nickel (Ni), connectivity of the internal electrodes 121 and 122 may be improved and a uniform thickness may be formed.

When the content of strontium-ruthenium oxide ($SrRuO_3$) is more than 10.0 parts by weight based on 100 parts by weight of nickel (Ni), firing may not be completed or dielectric properties may deteriorate. Accordingly, the content of strontium-ruthenium oxide ($SrRuO_3$) may be preferably less than 10.0 parts by weight based on 100 parts by weight of nickel (Ni), and more preferably less than 5.0 parts by weight.

The first and second ceramic green sheets may be alternately laminated such that the first stripe-shaped internal electrode pattern and the second stripe-shaped internal electrode pattern may be alternately laminated.

In this case, the portion forming capacitance by laminating the ceramic green sheet and the internal electrode pattern in the first direction may be defined as a green capacitance forming portion, and a cover portion green sheet may be disposed on both end-surfaces in the first direction of the green capacitance forming portion. More specifically, the cover portion green sheet may include a first cover portion green sheet disposed above the green capacitance forming portion in the first direction and a second cover portion green sheet disposed below the green capacitance forming portion in the first direction.

Thereafter, the first stripe-shaped internal electrode pattern may become the first internal electrode 121, and the second stripe-shaped internal electrode pattern may become the second internal electrode 122, while going through a firing process. Also, the first cover portion green sheet may become the first cover portion 112, and the second cover portion green sheet may become the second cover portion 113.

The thickness of the first and second ceramic green sheets may not be limited to any particular example.

However, to easily obtain miniaturization and high capacitance of a multilayer electronic component, the thickness of the first and second ceramic green sheets may be 0.6 µm or less, more preferably 0.4 µm or less.

Here, the thicknesses of the first and second ceramic green sheets may refer to sizes of the first and second ceramic green sheets in the first direction.

The thickness of the first and second internal electrode patterns may not be limited to any particular example.

However, to easily obtain miniaturization and high capacitance of a multilayer electronic component, the thickness of the first and second internal electrode patterns may be more than 0 µm and 0.4 µm or less, preferably 0.3 µm or less, and more preferably 0.15 µm or less.

The first ceramic green sheet on which plurality of first stripe-shaped internal electrode patterns parallel to each other are printed and the second ceramic green sheet on which a plurality of second stripe-shaped internal electrode patterns parallel to each other are printed may be alternately laminated, thereby forming a laminate body of the ceramic green sheets.

More specifically, the laminating may be performed such that distances between the central portion of the first stripe-shaped internal electrode pattern printed on the first ceramic green sheet and the second stripe-shaped internal electrode pattern printed on the second ceramic green sheet may overlap. Here, the region in which distances between the first and second internal electrode patterns overlap may be the green capacitance forming portion.

The ceramic green sheet laminate body may be cut to cross the plurality of first stripe-shaped internal electrode patterns and second stripe-shaped internal electrode patterns. That is, the ceramic green sheet laminate body may be a ceramic green sheet laminate body cut along cutting lines orthogonal to each other.

In an example embodiment, the cut ceramic green sheet laminate body may be referred to as a laminate body, and a person skilled in the art will be able to understand the descriptions without difficulty.

More specifically, the first stripe-shaped internal electrode pattern and the second stripe-shaped internal electrode pattern may be cut in the second direction and may be divided into a plurality of internal electrodes having a constant size in the third direction. In this case, the laminated ceramic green sheet may also be cut into a plurality of portion together with the internal electrode pattern, thereby preparing a plurality of laminate bodies. The size of the cut-out ceramic green sheet and the cut-out internal electrode pattern in the third direction may be the same.

Also, the cutting may be performed to suit individual body sizes along individual cutting lines. That is, a plurality of laminate bodies may be formed by cutting a bar-shaped ceramic green sheet laminate body into individual ceramic body sizes along a cutting line before attaching a margin portion green sheet described later.

That is, the rod-shaped ceramic green sheet laminate body may be cut such that a predetermined distance formed between the center of the first internal electrode and the second internal electrode, overlapping each other, may be cut along the same cutting line. Accordingly, ends of the first internal electrode and the second internal electrode may be alternately exposed to the cut-out surface.

Thereafter, a side margin portion green sheet may be formed on the side surface of the laminate body in the third direction.

More specifically, a first side margin portion green sheet may be formed on one surface of the laminate body in the third direction, for example, on the third surface 3, and a second side margin portion green sheet may be formed on the third direction surface of the laminate body, for example, the fourth surface 4.

Thereafter, the method may include firing the laminate body.

When firing the laminate body, the firing may be performed in a reducing atmosphere with a hydrogen concentration of 0.1 vol % or more and 0.5 vol % or less, preferably in an atmosphere with a hydrogen concentration of 0.11 vol %.

The firing temperature may be, for example, 1150° C. or more and 1300° ° C. or less, preferably 1200° C. or more and 1250° C. or less.

Thereafter, the method may include forming an external electrode on the fired laminate body.

More specifically, first external electrode paste may be applied to one surface of the laminate body in the second direction, for example, the third surface 3, and second external electrode paste may be applied to the other surface of the laminate body in the second direction, for example, the fourth surface 4, and the first external electrode 131 and the second external electrode 132 may be formed by firing the first and second external electrode pastes.

Also, a plating process may be further performed such that the external electrodes 131 and 132 may include the plating layers 131*b* and 132*b*.

The description of the external electrodes 131 and 132 may be the same as described in the aforementioned example embodiment and will thus not be provided.

The example embodiment has been described in detail above, but the example embodiment is not limited to the above-described embodiments and the accompanying drawings, but is intended to be limited by the appended claims. Accordingly, various forms of substitution and modification will be made by those skilled in the art within the scope of the technical spirit of the present disclosure described in the claims, which also falls within the scope of the present disclosure.

Hereinafter, e embodiment will be described in greater detail, which is help a detailed understanding of the present disclosure, and the scope of the present invention is not limited thereto.

Embodiment

Table 1 below lists connectivity (C), an average thickness (te), a thickness standard deviation (σte), and an average size (GD) of dielectric grains included in the dielectric layer, and a size standard deviation (σGD) of a nickel (Ni) internal electrode depending on the deposition content of strontium-ruthenium oxide (SrRuO₃).

Figure 7A:
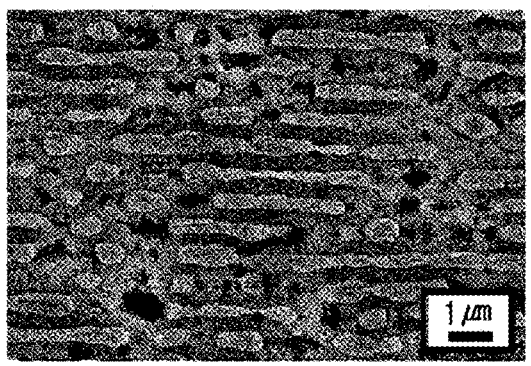
FIGS. 7A to 7D are images of a capacitance forming portion obtained by an SEM according to example embodiments and comparative examples.

More specifically, test example 1 was prepared by applying nickel (Ni) internal electrode paste, which is a general internal electrode formation method, not by applying a sputtering method, and strontium-ruthenium oxide (SrRuO₃) was not added. FIG. 7A is an image obtained by capturing a capacitance forming portion of a sample chip of test example 1.

Figure 7B:
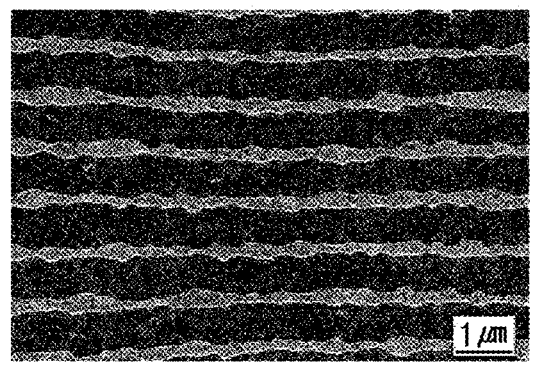

In test example 2, an internal electrode was formed by applying a sputtering method, and 2.5 parts by weight of strontium-ruthenium oxide (SrRuO₃) based on 100 parts by weight of nickel (Ni) was deposited simultaneously with nickel (Ni), thereby forming the nickel (Ni) internal electrode. FIG. 7B is an image of a capacitance forming portion of a sample chip of test example 2.

Figure 7C:
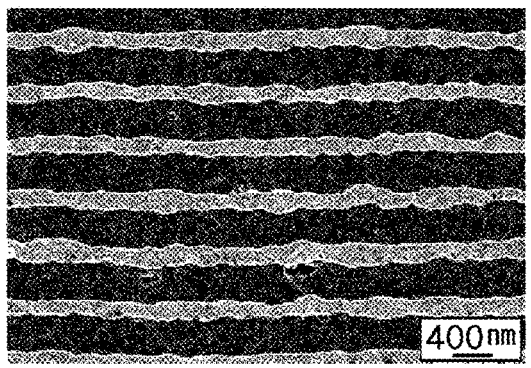

In test example 3, an internal electrode was formed by applying a sputtering method, and 5.0 parts by weight of strontium-ruthenium oxide (SrRuO₃) based on 100 parts by weight of nickel (Ni) was deposited simultaneously with nickel (Ni), thereby forming the nickel (Ni) internal electrode. FIG. 7C is an image obtained by capturing the capacitance forming portion of a sample chip of test example 3.

Figure 7D:
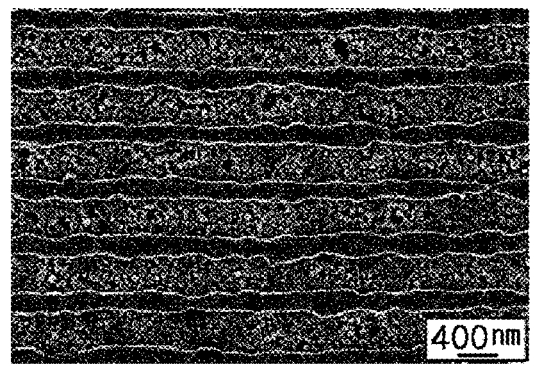

In test example 4, an internal electrode was formed by applying a sputtering method, and 10.0 parts by weight of strontium-ruthenium oxide (SrRuO₃) against 100 parts by weight of nickel (Ni) was deposited simultaneously with nickel (Ni), thereby forming the nickel (Ni) internal electrode. FIG. 7D is an image obtained by capturing the capacitance forming portion of a sample chip of test example 4.

The added content of strontium-ruthenium oxide (SrRuO₃) for each test example was a content before firing, and corresponds to the deposition content using the sputtering method (except for test example 1).

The mass percentages (wt %) of nickel (Ni), strontium (Sr), and ruthenium (Ru) were the contents of the elements measured through SEM-EDS elemental analysis on the internal electrode in the capacitance forming portion of the sample chip after firing, and the sum of the contents of nickel (Ni), strontium (Sr), and ruthenium (Ru) was converted to 100 wt % and listed in Table 1.

TABLE 1

| | Test No. | Test example 1 | Test example 2 | Test example 3 |
|---|---|---|---|---|
| Before firing | SrRuO₃ content (parts by weight) | 0 parts by weight | 2.5 parts by weight | 5.0 parts by weight |
| After firing | Ni (wt %) | 100 | 98.45 | 96.39 |
| | Sr (wt %) | 0 | 0.40 | 1.18 |
| | Ru (wt %) | 0 | 1.15 | 2.43 |
| | (Sr + Ru)/(Ni + Sr + Ru) (wt %) | 0 | 1.55 | 3.61 |
| | C (%) | 62% | 96% | 97% |
| | te (nm) | 446 nm | 217 nm | 208 nm |
| | σte (nm) | 85 nm | 65 nm | 88 nm |
| | GD (nm) | — | 250 nm | 90 nm |
| | σGD (nm) | — | 54.1 nm | 33.6 nm |

In test example 1, connectivity C of the internal electrode was 62%, and connectivity C was poor as compared to test examples 2 to 4 in which SrRuO₃ was added. This is because the method of applying the internal electrode paste was applied and SrRuO₃ was not added. Also, the average thickness te of the internal electrode was 446 nm, such that the ultra-thin thickness of 300 nm or less of the internal electrode was not obtained.

In test example 2 in which 2.5 parts by weight of SrRuO₃ was added, 98.45 wt % of Ni, 0.40 wt % of Sr, and 1.15 wt % of Ru were detected at the internal electrode, which indicates that (Sr+Ru)/(Ni+Sr+Ru) value was 1.55 (wt %). The average thickness (te) of the internal electrode was 217 nm, the thickness standard deviation (σte) was 65 nm, and the connectivity (C) was 96%, such that, as compared to test example 1, the internal electrode had an ultra-thin thickness, and a uniform thickness was obtained. It was observed that the average size (GD) of the dielectric grains included in the dielectric layer was 250 nm, and the size standard deviation (σGD) was 54.1 nm, which may be because grain growth of dielectric grains was facilitated as Sr of $SrRuO_3$ diffused into the dielectric layer during the firing process.

Figure 8A:
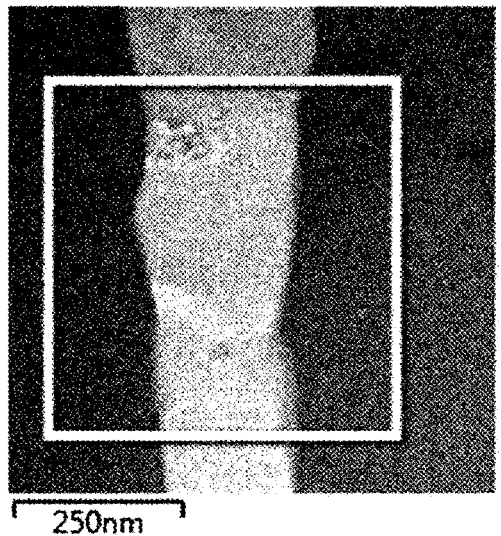
FIG. 8A is an image of a capacitance forming portion obtained by an SEM according to an example embodiment of the present disclosure.
Figure 8B:
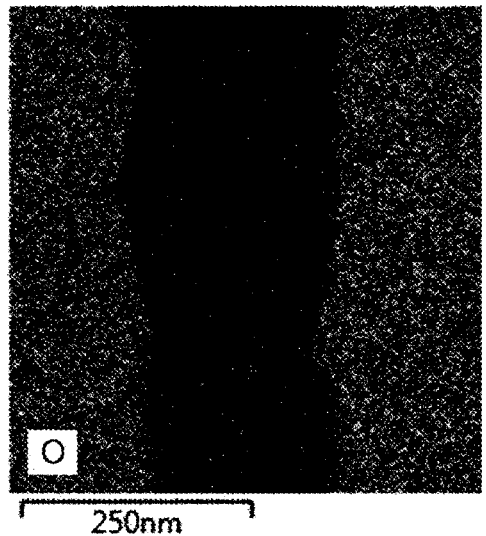
FIGS. 8B to 8D are images of mapping specific elements using an SEM-EDS according to an example embodiment of the present disclosure.
Figure 8C:
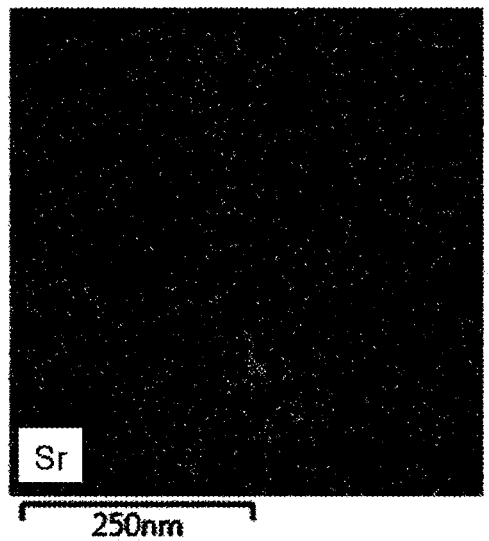
Figure 8D:
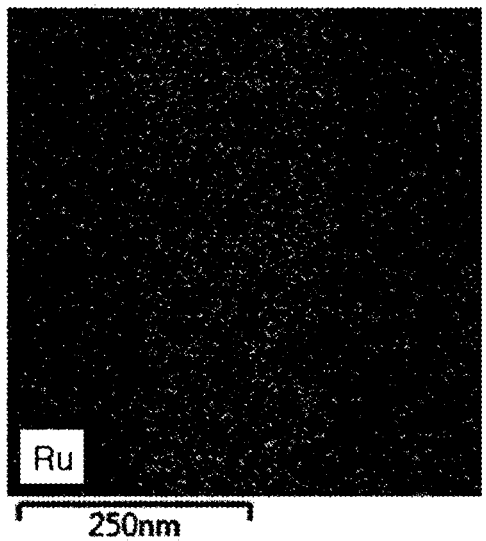

FIGS. 8A to 8D are images of a capacitance forming portion of test example 2 captured through SEM and an image obtained by EDS elemental analysis of a portion of regions. More specifically, FIG. 8A is an SEM image of an internal electrode and a dielectric layer, and FIGS. 8B to 8D are images of oxygen (O), strontium (Sr), and ruthenium (Ru) elements included in the rectangular region in FIG. 8A analyzed by EDS. A region having a large amount of oxygen (O) element detected in FIG. 8B corresponds to a dielectric layer, and a region having a small amount of oxygen (O) element corresponds to an internal electrode. Referring to FIG. 8C, it may be confirmed that strontium (Sr) elements were aggregated in a portion of regions of the internal electrode, and that the elements were uniformly detected even in the dielectric layer, which may indicate that the grain growth of dielectric grains was affected. Referring to FIG. 8D, it may be confirmed that ruthenium (Ru) elements were detected from the internal electrode and the dielectric layer, but more ruthenium (Ru) was detected from the internal electrode than from the dielectric layer, which may indicate that diffusion into the dielectric layer occurred less the firing process.

In test example 3 in which 5.0 parts by weight of $SrRuO_3$ was added, 96.39 wt % of Ni, 1.18 wt % of Sr, and 2.43 wt % of Ru were detected in the internal electrode, which may indicate that (Sr+Ru)/(Ni+Sr+Ru) value was 3.61. The average thickness (te) of the internal electrode was 208 nm, the thickness standard deviation (σte) was 88 nm, and the connectivity (C) was 97%, such that as compared to test example 1, an internal electrode having an ultra-thin thickness was formed and a uniform thickness was obtained. The average size (GD) of the dielectric grains included in the dielectric layer was 90 nm, and the size standard deviation (σGD) was observed to be 33.6 nm, which may indicate that, as Sr of $SrRuO_3$ diffused into the dielectric layer during the firing process, the uniform grain growth of dielectric grains was affected, but that a rather small amount of Sr was added, rather than a proper content thereof, grain growth was prevented.

Figure 9A:
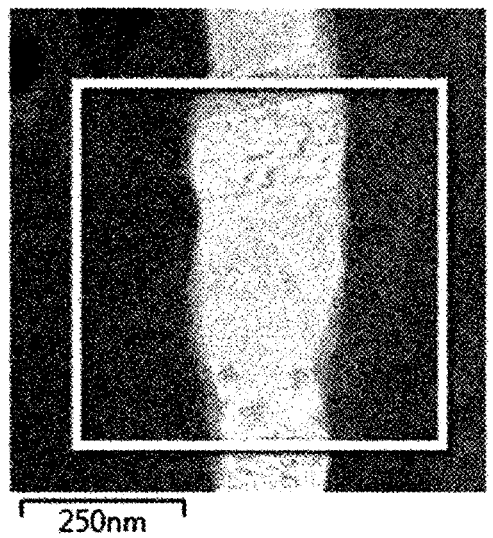
FIG. 9A is an image of a capacitance forming portion obtained by an SEM according to an example embodiment of the present disclosure.
Figure 9B:
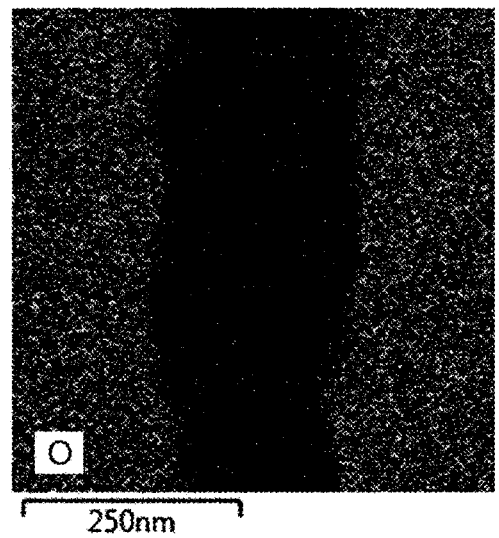
FIGS. 9B to 9D are images of mapping specific elements using an SEM-EDS according to an example embodiment of the present disclosure.
Figure 9C:
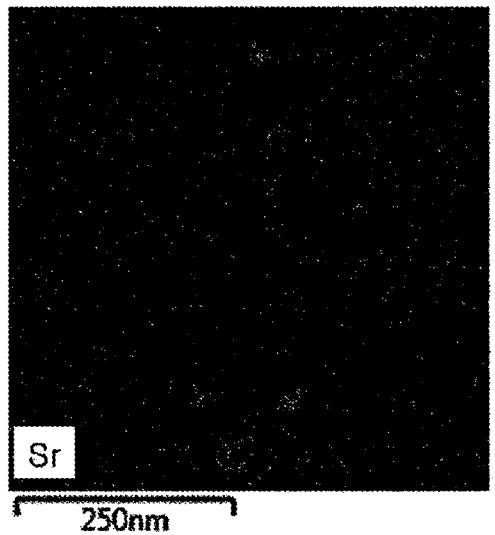
Figure 9D:
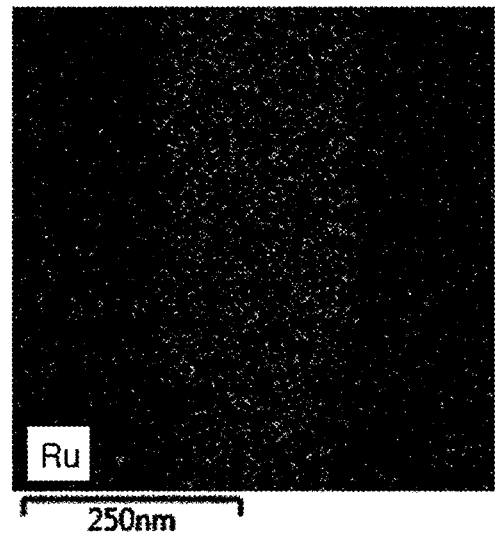

FIGS. 9A to 9D are images of the capacitance forming portion of test example 3 captured through SEM and an image obtained by EDS elemental analysis of a portion regions. More specifically, FIG. 9A is an SEM image of an internal electrode and a dielectric layer, and FIGS. 9B to 9D are images of oxygen (O), strontium (Sr), and ruthenium (Ru) elements included in the rectangular region in FIG. 9A analyzed by EDS. A region with a large amount of oxygen (O) element detected in FIG. 9B corresponds to a dielectric layer, and a region with a small amount of oxygen (O) element corresponds to an internal electrode. Referring to FIG. 9C, it may be confirmed that strontium (Sr) elements were aggregated in a portion of regions of the internal electrode, and that the elements were uniformly detected in the dielectric layer, which may indicate that the grain growth of dielectric grains was affected. Referring to FIG. 9D, it may be confirmed that ruthenium (Ru) elements were detected from the internal electrode and the dielectric layer, but more ruthenium (Ru) was detected from the internal electrode than from the dielectric layer, which may indicate that diffusion into the dielectric layer occurred less during the firing process.

Although not listed in the table, in test example 4 in which 10.0 parts by weight of $SrRuO_3$ was added, connectivity (C) of the internal electrode was 99%, which is excellent, the thickness (te) of the internal electrode was 201 nm, and the thickness standard deviation (σte) was 46 nm such that an internal electrode having ultra-thin thickness was formed and a uniform thickness was obtained. However, the size standard deviation (σGD) of the dielectric grains included in the dielectric layer had a uniform size of 27.8 nm, but the average size (GD) of the dielectric grains was 66 nm, which is relatively small, and the firing was not performed completely, such that it was not possible to measure dielectric properties. This is because the grain growth of the dielectric particles was excessively suppressed by Sr diffused into the dielectric layer region due to the excessive amount of Sr.

According to the aforementioned example embodiments, miniaturization and high capacitance of a multilayer electronic component may be obtained.

Also, a thickness of an internal electrode may be reduced.
Also, connectivity of an internal electrode may improve.
Also, uniformity of an internal electrode may improve.
Also, uniformity of a dielectric grain may improve.

While the example embodiments have been illustrated and described above, it will be configured as apparent to those skilled in the art that modifications and variations could be made without departing from the scope of the present disclosure as defined by the appended claims.

What is claimed is:

1. A multilayer electronic component, comprising:
   a body including a plurality of dielectric layers and a plurality of internal electrodes, wherein at least one of the plurality of internal electrodes includes Ni, Sr, and Ru, and an average content of (Sr+Ru)/(Ni+Sr+Ru) is more than 0 wt % and less than 8.40 wt %; and
   external electrodes disposed on the body.

2. The multilayer electronic component of claim 1, wherein the average content of (Sr+Ru)/(Ni+Sr+Ru) is more than 0 wt % and 3.61 wt % or less.

3. The multilayer electronic component of claim 2, wherein the average content of (Sr+Ru)/(Ni+Sr+Ru) is 1.55 wt % or more and 3.61 wt % or less.

4. The multilayer electronic component of claim 1, wherein an average content of Sr/(Ni+Sr+Ru) of at least one of the plurality of internal electrodes is more than 0 wt % and less than 1.18 wt %.

5. The multilayer electronic component of claim 1, wherein an average content of Ru/(Ni+Sr+Ru) of at least one of the plurality of internal electrodes is more than 0 wt % and less than 2.43 wt %.

6. The multilayer electronic component of claim 1, wherein an average thickness of at least one of the plurality of internal electrodes is 0.3 μm or less.

7. The multilayer electronic component of claim 6, wherein an average thickness of at least one of the plurality of internal electrodes is 0.22 μm or less.

8. The multilayer electronic component of claim 1, wherein a percentage (CV %) of a coefficient of variation, which is a ratio of a standard deviation of a thickness of the at least one of the plurality of internal electrodes to an average thickness of the at least one of the plurality of internal electrodes, is 43% or less.

9. The multilayer electronic component of claim 8, wherein the percentage (CV %) of the coefficient of variation is 30% or less.

10. The multilayer electronic component of claim 1,
    wherein the at least one of the plurality of internal electrodes includes an electrode region including a conductive material and a disconnected region free of the conductive material, and wherein the at least one of the plurality of internal electrodes satisfies 90%≤C, where C is connectivity of the at least one of the plurality of internal electrodes and is defined as a ratio of a sum of lengths of the electrode region to a total length of the at least one of the plurality of internal electrodes.

11. The multilayer electronic component of claim 1, wherein an average content of Ru included in the at least one of the plurality of internal electrodes is higher than an average content of Ru included in at least one of the plurality of dielectric layers.

12. The multilayer electronic component of claim 1, wherein the at least one of the plurality of internal electrodes includes a plurality of metal crystal grains, a metal grain boundary is disposed between metal grains adjacent to each other, and Ru is disposed on the metal grain boundary.

13. The multilayer electronic component of claim 1, wherein the at least one of the plurality of internal electrodes includes an oxide including at least one element of Sr and Ru.

14. The multilayer electronic component of claim 1, wherein the at least one of the plurality of internal electrodes includes at least one of a Ni—Sr alloy and a Ni—Ru alloy.

15. The multilayer electronic component of claim 1,
wherein at least one of the plurality of dielectric layers includes a plurality of dielectric grains, and
wherein an average size of the plurality of dielectric grains is 50 nm or more and 300 nm or less.

16. The multilayer electronic component of claim 1,
wherein at least one of the plurality of dielectric layers includes a plurality of dielectric grains, and
wherein a percentage (CV %) of a coefficient of variation, which is a ratio of a standard deviation of a size of the plurality of dielectric grains to an average size of the plurality of dielectric grains, is 38% or less.

17. The multilayer electronic component of claim 16, wherein the percentage (CV %) of the coefficient of variation is 22% or less.

18. The multilayer electronic component of claim 1, wherein at least one of the plurality of dielectric layers includes Sr.

19. The multilayer electronic component of claim 18, wherein the at least one of the plurality of dielectric layers includes a plurality of dielectric grains, a dielectric grain boundary is disposed between dielectric grains adjacent to each other, and Sr is disposed on the dielectric grain boundary.

20. The multilayer electronic component of claim 1, wherein an average thickness of at least one of the plurality of dielectric layers is 1.0 μm or less.

21. The multilayer electronic component of claim 1, wherein an average thickness of the at least one of the plurality of internal electrodes is less than an average thickness of at least one of the plurality of dielectric layers.

22. A method of manufacturing a multilayer electronic component, the method comprising:
forming a laminate body by laminating a plurality of ceramic green sheets on which a plurality of internal electrode patterns are formed, and cutting the ceramic green sheets;
firing the laminate body; and
forming an external electrode on the fired laminate body,
wherein at least one of the plurality of internal electrode patterns is formed by depositing Ni and $SrRuO_3$ using a sputtering method, and
wherein a content of $SrRuO_3$ is more than 0 parts by weight and less than 10.0 parts by weight based on 100 parts by weight of Ni.

23. The method of claim 22, wherein the content of $SrRuO_3$ is more than 0 parts by weight and less than 5.0 parts by weight based on 100 parts by weight of Ni.

24. The method of claim 23, wherein the content of $SrRuO_3$ is 2.5 parts by weight or more and 5.0 parts by weight or less based on 100 parts by weight of Ni.

25. The method of claim 22, wherein the sputtering method includes depositing Ni using a first sputtering gun and depositing $SrRuO_3$ using a second sputtering gun.

26. The method of claim 25, wherein the sputtering method includes simultaneously depositing Ni and $SrRuO_3$.

27. The method of claim 22, wherein at least one of the plurality of ceramic green sheets is free of $SrRuO_3$.

28. The method of claim 22, wherein an average thickness of at least one of the plurality of internal electrode patterns is 0.3 μm or less.

29. The method of claim 22, wherein the sputtering method further includes forming the plurality of internal electrode patterns using a mask.

30. The method of claim 22, wherein the firing of the laminate body is performed in a reducing atmosphere having a hydrogen concentration of 0.1 vol % or more.

31. The method of claim 22, wherein the firing of the laminate body is performed at a temperature of 1150° C. or more and 1300° C. or less.

32. The method of claim 22, wherein the sputtering method is performed under a pressure condition of $10^{-5}$ torr or more.

33. The method of claim 22, wherein a thickness of at least one of the plurality of internal electrode patterns is proportional to a sputtering deposition time.

34. The method of claim 22, wherein an average thickness of at least one of the plurality of ceramic green sheets is 1.0 μm or less.

35. A method of manufacturing a multilayer electronic component, the method comprising:
laminating a plurality of ceramic green sheets, wherein an internal electrode pattern is disposed on at least one of the plurality of ceramic green sheets, the internal electrode pattern includes Ni and $SrRuO_3$, and a content of $SrRuO_3$ is more than 0 parts by weight and less than 10.0 parts by weight based on 100 parts by weight of Ni.

36. The method of claim 35, wherein the content of $SrRuO_3$ is more than 0 parts by weight and less than 5.0 parts by weight based on 100 parts by weight of Ni.

37. The method of claim 35, wherein the content of $SrRuO_3$ is 2.5 parts by weight or more and 5.0 parts by weight or less based on 100 parts by weight of Ni.

38. The method of claim 35, wherein the at least one of the plurality of ceramic green sheets is free of $SrRuO_3$.

39. The method of claim 35, further comprising depositing Ni and $SrRuO_3$ on to the at least one of the plurality of ceramic green sheets using a sputtering method.

40. The method of claim 39, wherein the sputtering method includes depositing Ni using a first sputtering gun and depositing $SrRuO_3$ using a second sputtering gun.

41. The method of claim 39, wherein the sputtering method includes simultaneously depositing Ni and $SrRuO_3$.

42. A multilayer electronic component, comprising:
a body including a plurality of dielectric layers and a plurality of internal electrodes; and
external electrodes disposed on the body, wherein at least one of the plurality of internal electrodes includes Ni, Sr, and Ru, and an average content of (Sr+Ru)/(Ni+Sr+Ru) is more than 0 wt % and 3.61 wt % or less, wherein the at least one of the plurality of internal electrodes includes an electrode region including a conductive material and a disconnected region free of the conductive material, and wherein the at least one of the plurality of internal electrodes satisfies 90%≤C, where C is connectivity of the at least one of the plurality of internal electrodes and is defined as a ratio of a sum of lengths of the electrode region to a total length of the at least one of the plurality of internal electrodes.

43. The multilayer electronic component of claim 42, wherein at least one of the plurality of internal electrodes includes an oxide including at least one element of Sr and Ru.

44. The multilayer electronic component of claim 42, wherein at least one of the plurality of internal electrodes includes at least one of a Ni—Sr alloy and a Ni—Ru alloy.

45. The multilayer electronic component of claim 42, wherein an average thickness of at least one of the plurality of internal electrodes is 0.3 μm or less.

46. The multilayer electronic component of claim 42, wherein at least one of the plurality of dielectric layers includes Sr.

47. The multilayer electronic component of claim 46, wherein at least one of the plurality of dielectric layers includes a plurality of dielectric grains, a dielectric grain boundary is disposed between dielectric grains adjacent to each other, and Sr is disposed on the dielectric grain boundary.

48. The multilayer electronic component of claim 1, wherein the average content of (Sr+Ru)/(Ni+Sr+Ru) is in a range from 0 at % to 1.47 at %.

* * * * *